United States Patent
Pope

(10) Patent No.: US 9,736,972 B1
(45) Date of Patent: Aug. 22, 2017

(54) WEED EXTRACTION TOOL

(71) Applicant: FAULTLESS STARCH—BON AMI COMPANY, Kansas City, MO (US)

(72) Inventor: Stephen M. Pope, Lenexa, KS (US)

(73) Assignee: FAULTLESS STARCH/BON AMI COMPANY, Kansas City, MO (US)

( * ) Notice: Subject to any disclaimer, the term of this patent is extended or adjusted under 35 U.S.C. 154(b) by 0 days.

(21) Appl. No.: 14/080,315

(22) Filed: Nov. 14, 2013

Related U.S. Application Data

(60) Provisional application No. 61/726,254, filed on Nov. 14, 2012.

(51) Int. Cl.
*A01B 1/16* (2006.01)

(52) U.S. Cl.
CPC ...................... *A01B 1/16* (2013.01)

(58) Field of Classification Search
CPC .............. A01B 1/16; A01B 1/18; A01B 1/165
USPC .......................... 172/343, 377, 378, 380, 381
See application file for complete search history.

(56) References Cited

U.S. PATENT DOCUMENTS

| | | | | |
|---|---|---|---|---|
| 1,225,188 A | * | 5/1917 | Smith | 294/50.5 |
| 1,301,442 A | * | 4/1919 | Ike | 172/25 |
| 1,501,965 A | * | 7/1924 | Moors | 294/50.5 |
| 1,867,086 A | * | 7/1932 | Meixell | A01B 1/16 294/50.6 |
| 2,030,770 A | * | 2/1936 | Smith | A01B 1/165 172/22 |
| 2,055,266 A | * | 9/1936 | Thomas | 111/7.2 |
| 3,123,391 A | * | 3/1964 | Novak | 294/50.7 |
| 3,443,830 A | * | 5/1969 | Jones | 294/50.7 |
| 4,603,744 A | * | 8/1986 | Ramirez | A01B 1/16 172/25 |
| 4,779,913 A | * | 10/1988 | Henry | 294/50.9 |
| 4,884,638 A | * | 12/1989 | Hoffman | 172/22 |
| 5,234,241 A | * | 8/1993 | Ikerd | 294/50.8 |
| 5,338,078 A | * | 8/1994 | Basek | 294/50.5 |
| 6,257,346 B1 | * | 7/2001 | Schofield et al. | 172/381 |
| 7,281,740 B1 | * | 10/2007 | Fields | 294/100 |
| 2001/0045293 A1 | * | 11/2001 | Tam | 172/378 |
| 2009/0194300 A1 | * | 8/2009 | Oberg | 172/1 |

* cited by examiner

*Primary Examiner* — Robert Pezzuto
*Assistant Examiner* — Jessica H Lutz
(74) *Attorney, Agent, or Firm* — Stinson Leonard Street LLP

(57) ABSTRACT

A weed extraction tool includes an actuator having two parallel blades formed from a single piece bent into a u-shape. The blades have serrated leading edges and a deep notch in the upper third of the blade trisection above the serrations to facilitate extraction of undesired plants.

12 Claims, 2 Drawing Sheets

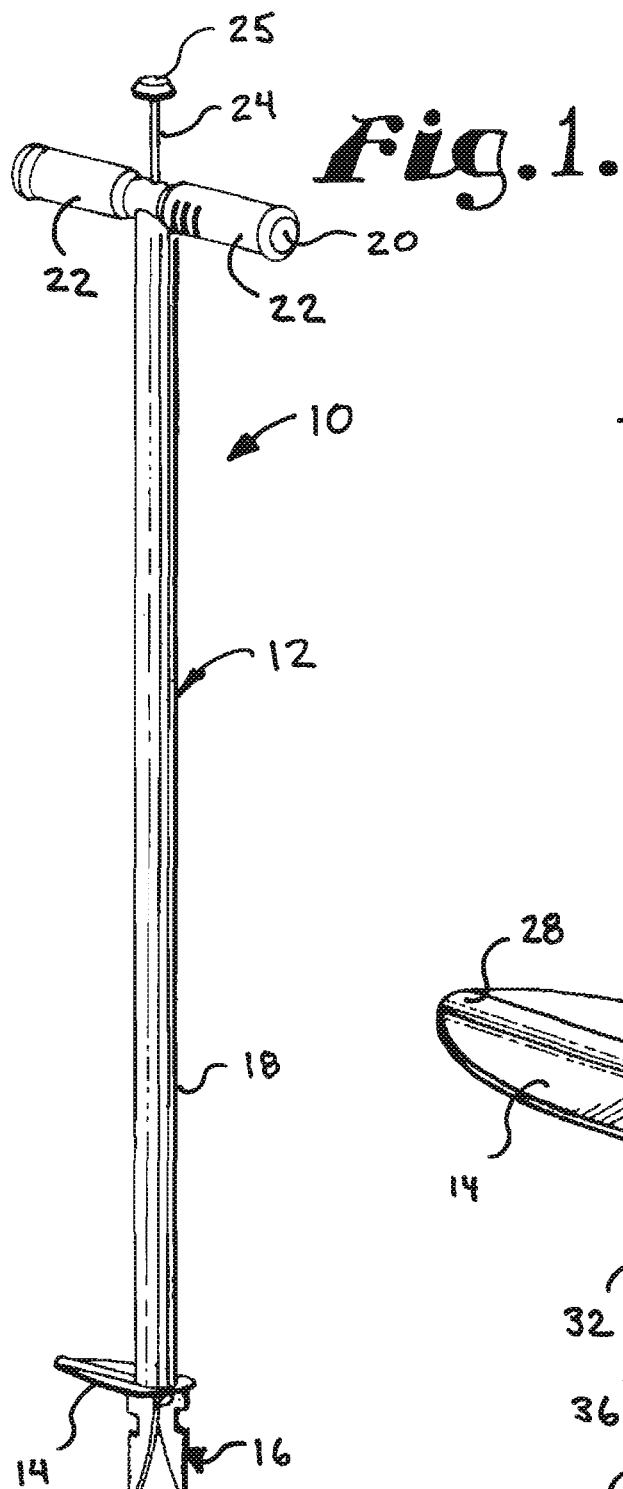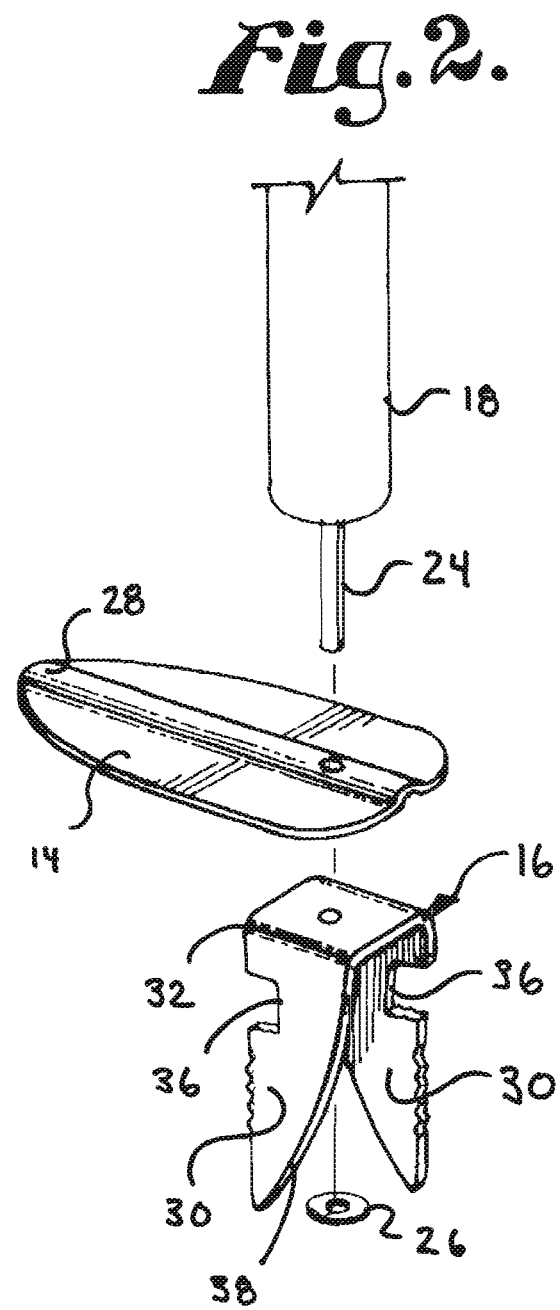

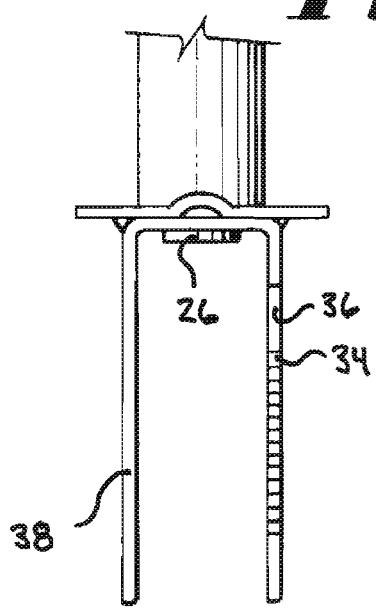
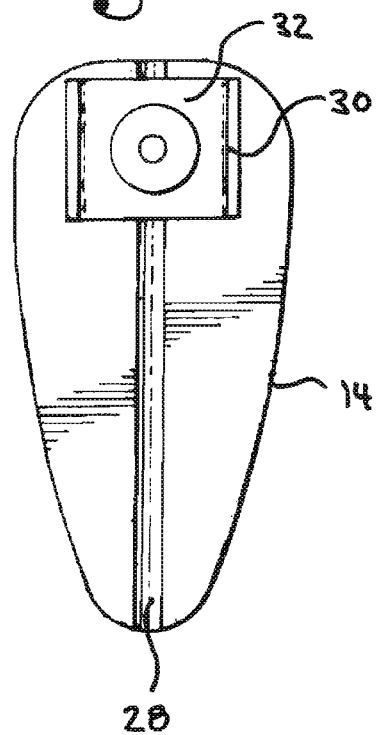

WEED EXTRACTION TOOL

CROSS-REFERENCE TO RELATED APPLICATIONS

This application is based on and claims priority to U.S. Provisional Application Ser. No. 61/726,254, filed on Nov. 14, 2012, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to lawn and garden equipment and, more specifically, to a weed extraction tool having an improved blade design.

2. Description of Related Art

This invention relates generally to lawn and garden equipment and, more specifically, to a weed extraction tool having an improved blade design.

Tools for removing weeds from the yard are popular and well-known. Simple tools, such as hoes and rakes, can be used to remove above-ground portions of weeds or other undesired plants. These tools, however, are particularly ineffective in removing subterranean roots, thus the removed plants often quickly grow back. Tools have been developed to remove the entire plant, including the roots. One particular known tool is a two-bladed device that is inserted into the soil at the base of a plant and rotated to cut the roots. The plant is then removed from the ground by pulling upwardly on the tool. That tool may include a plunger for pushing the extracted plant out from the blades. While more effective than simple tools, these newer devices are still not entirely effective in cutting and removing the root system of the plant. Furthermore, the arrangement of the blades is such devices leads to unreliability and breakage from the high torque applied when rotating the device underground. Thus, there remains a need in the art for a durable weed extraction tool that is more effective at cutting and extracting the root system of a plant.

BRIEF SUMMARY OF THE INVENTION

The present invention represents an improvement over existing weed extraction tools. In an exemplary embodiment, the tool comprises parallel blades formed from a single piece of metal that is bent into a generally U-shape and welded to the lower portion of the handle. The construction of the blades from a single piece of metal provides strength and resistance to breakage in comparison to tools in which the blades are separately attached. In another exemplary embodiment of the present invention, each blade is serrated to provide sawing and cutting capability. In yet another exemplary embodiment, each blade includes a deep notch in the cutting edge that facilitates extraction of the undesired plant from the ground.

BRIEF DESCRIPTION OF THE DRAWINGS

FIG. 1 is a perspective view of a weed extraction tool according to an exemplary embodiment of the present invention;

FIG. 2 is an exploded view of the actuator end of the weed extraction tool of FIG. 1 showing the blades and footplate;

FIG. 3 is a fragmentary enlarged front elevational view of the blade portion of the actuator of the weed extraction tool of FIG. 1; and FIG. 4 is a bottom plan view of the weed extraction tool of FIG. 1 showing the actuator and the associated footplate.

DETAILED DESCRIPTION OF EXEMPLARY EMBODIMENTS

Referring initially to FIG. 1, a weed extraction tool in accordance with an exemplary embodiment of the present invention is designated generally by the numeral 10. Tool 10 includes a handle portion 12 comprised of an elongated stem 18 extending between upper and lower ends with a horizontal grip portion 20 rigidly affixed at the upper, operator end of the tool in a T-configuration to allow an operator to rotate the tool. A pair of handgrips 22, one on each end of the grip portion, provides a gripping surface for the operator. A footplate 14 and an actuator 16 are rigidly affixed at the lower, working end of stem 18.

Stem 18 is a hollow tube, with an interior passageway extending therethrough between the upper and lower ends. Cylindrical plunger 24 extends into and through the passageway in the stem with knob 25 affixed to the upper end of the plunger to allow an operator to grasp the plunger to extend and/or retract it into and/or out of the stem. Looking to FIG. 2, the lower end of plunger 24 terminates in a cap 26 affixed at the lower end of the plunger, positioned on the underside of the actuator 16.

Stem 18 is preferably formed from a rigid, durable material such as steel. Preferably stem 18 is of a length to provide a comfortable working distance above the ground surface for a person using the tool, most preferably in the range of thirty to thirty-six inches.

Horizontal grip portion 20 preferably cylindrical or tubular, with a perpendicularly oriented socket formed at the midpoint, the socket configured to receive the upper end of stem. Horizontal grip portion 20 is preferably oriented perpendicularly to stem 18 to form a T shape that allows an operator to grasp and control the tool. Horizontal grip portion 20 is preferably formed from a rigid, durable material and is preferably permanently affixed to stem 18 via welding or other permanent attachment or adhesion.

Looking to FIG. 2, footplate 14 is an elongated plate that provides a surface for an operator to use his or her foot to press the actuator of the tool into the ground. Footplate 14 is generally curvilinear in shape with a rib 28 extending end to end, generally in the center of the plate. The plate is secured by welding to the bottom of stem 18. Rib 28 provides structural reinforcement of the plate to prevent bending, and provides a frictional surface that facilitated retention of the user's foot. Footplate 14 is preferably made from a rigid, durable material, and is preferably welded to the lower end of stem 18.

Looking to FIGS. 2 and 3, actuator 16 formed from a single piece of material that is bent into a generally U shape, with parallel blades 30 extending downwardly on either side of a bight portion 32. Each blade 30 has a vertical serrated edge 34 that faces in the opposite direction from the other blade. Each blade further includes a generally U shaped notch 36 formed in the upper third of the blade's trisection, above the serrations. The notch preferably has a depth that is at least three times the depth of the adjacent serrations. The trailing edge 38 of each blade 30 extends in a continuous arc from the bight portion 32 to the tip of the serrated edge 34. Actuator 16 is preferably formed from a single piece of rigid, durable material, such as metal. Actuator 16 is preferably welded to the bottom of foot plate 14, which is in turn welded to the lower end of stem 18, to form a contiguous, strong connection between the three pieces.

As seen in FIGS. 3 and 4, with the footplate 14 and actuator 16 welded and secured in place, cap 26 at the lower end of plunger 24 is positioned below the attachment surface of actuator 16. When viewed in conjunction with FIG. 1, it can be seen that the plunger 24 actuates within stem 18 between the limits established by the upper-end knob 25 and the lower end cap 26. Preferably, the plunger is operable to actuate in the range of approximately one to three inches. Thus, the plunger can be retracted upwardly (towards the operator) by an operator grasping and pulling handle 25, and can be extended downwardly by an operator pushing on handle 25.

In use, tool 10 is operated by a user grasping the handgrips 22 on horizontal portion 20 of handle 12, and positioning the actuator 16 end of the tool on the ground directly over the center of a weed or other undesired plant. The actuator is pressed into the ground by the foot of a user applying pressure to footplate 14. With the actuator 16 in the ground, the user rotates the tool by turning the handle. The serrated edges of the blades simultaneously cut through the roots of the plant and cut a path through the dirt, allowing the tool to rotate more easily. The notches 36 in the blades also catch portions of the root of the plant. The weed is then extracted by pulling upward on the handle to remove the plant from the ground. Using the plunger 24, the operator may dislodge the weed from the tool by pressing handle 25 so that cap 26 (at the lower end of the plunger) forces the weed from the actuator.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A weed extraction tool comprising:
   an operator handle; and
   a fixed actuator attached to said handle comprising first and second blades extending away from a central bight portion, wherein said blades are generally parallel and are spaced apart a distance from each other, wherein each of said blades is generally planar, wherein each of said blades comprises a leading edge and a trailing edge, wherein said leading edge is generally linear and comprises serrations, wherein said leading edge comprises a horizontally oriented "U" shaped notch in the upper third of the blade, said notch configured to capture and extract roots of weeds, wherein said "U" shaped notch has a depth of at least three times a depth of one of said serrations.

2. The weed extraction tool of claim 1, wherein said leading edge on said first blade is oriented in a direction opposite said leading edge on said second blade.

3. The weed extraction tool of claim 1, wherein said actuator and blades are contiguous and formed from a single piece of metal.

4. The weed extraction tool of claim 1, wherein said operator handle comprises a stem portion and a horizontal grip affixed in a T-shaped configuration at an upper end of said stem.

5. The weed extraction tool of claim 4, further comprising a plunger operable to extend and retract within said stem.

6. The weed extraction tool of claim 1, wherein the trailing edge is curvilinear.

7. The weed extraction tool of claim 1, further comprising a foot plate attached to the handle.

8. The weed extraction tool of claim 1, wherein the leading edge is generally vertical.

9. The weed extraction tool of claim 1, wherein the trailing edge extends in a continuous arc.

10. A weed extraction tool comprising:
    an operator handle;
    a foot plate attached to said handle; and
    a fixed actuator affixed to a lower end of said handle, said actuator comprising a parallel set of spaced apart blades extending away from a central bight portion, wherein each of said blades is generally planar, each of said blades comprising a leading, serrated edge, the leading, serrated edges of the blades directed in opposing directions, wherein said leading, serrated edge is vertical and linear, wherein each of said blades comprises a trailing edge extending in a continuous arc, and wherein said leading, serrated edge comprises a horizontally oriented "U" shaped root extraction notch in the upper third of the blade trisection, wherein said "U" shaped root extraction notch has a depth of at least three times a depth of a serration in said leading, serrated edge.

11. A weed extraction tool comprising:
    an operator handle comprising a stem portion and a horizontal grip portion in perpendicular relationship;
    a foot plate attached to a lower end of said handle; and
    a fixed actuator attached to said handle adjacent said foot plate, said actuator comprising a parallel set of generally planar blades extending away from a central bight portion, wherein said blades are spaced apart a distance from each other, wherein each of said blades comprises a leading, serrated edge, oppositely oriented from the leading, serrated edge on the other blade, wherein said leading, serrated edge comprises a horizontally oriented "U" shaped notch in the upper third of the blade trisection, wherein said leading, serrated edge is generally linear and vertical, and wherein each of said blades comprises a curved trailing edge, wherein said "U" shaped notch has a depth of at least three times a depth of a serration in said leading, serrated edge.

12. The weed extraction tool of claim 11, further comprising a plunger extending through said stem, said plunger operable to dislodge an extracted plant from said tool.

* * * * *